United States Patent
Stering

(10) Patent No.: US 9,095,801 B2
(45) Date of Patent: Aug. 4, 2015

(54) FILTER DEVICE TEST APPARATUS, FILTER INTEGRITY TESTING METHOD AND COMPUTER PROGRAM PRODUCT

(75) Inventor: Magnus Stering, Le mesnil le roi (FR)

(73) Assignee: Sartorius Stedim Biotech GmbH (DE)

( * ) Notice: Subject to any disclaimer, the term of this patent is extended or adjusted under 35 U.S.C. 154(b) by 546 days.

(21) Appl. No.: 13/207,498

(22) Filed: Aug. 11, 2011

(65) Prior Publication Data

US 2012/0059603 A1    Mar. 8, 2012

(30) Foreign Application Priority Data

Sep. 6, 2010   (EP) ..................................... 10290476

(51) Int. Cl.
| | | |
|---|---|---|
| *G01F 1/00* | (2006.01) | |
| *B01D 46/00* | (2006.01) | |
| *B01D 65/10* | (2006.01) | |
| *B01D 71/36* | (2006.01) | |
| *B01D 71/68* | (2006.01) | |

(52) U.S. Cl.
CPC ............ *B01D 46/0086* (2013.01); *B01D 65/10* (2013.01); *B01D 71/36* (2013.01); *B01D 71/68* (2013.01)

(58) Field of Classification Search
CPC .... B01D 46/0086; B01D 65/10; B01D 71/68; B01D 71/36
USPC ........ 702/47, 12, 24, 34, 35, 45, 114; 210/85, 210/90, 650; 73/861
See application file for complete search history.

(56) References Cited

U.S. PATENT DOCUMENTS

| | | | |
|---|---|---|---|
| 4,872,974 A | | 10/1989 | Hirayama et al. |
| 4,881,176 A | * | 11/1989 | Kononov ....................... 700/271 |
| 2003/0234211 A1 | * | 12/2003 | Seiler et al. ...................... 210/85 |
| 2006/0112757 A1 | * | 6/2006 | Morse ............................... 73/38 |
| 2008/0156709 A1 | * | 7/2008 | Johnson ......................... 210/106 |
| 2009/0218285 A1 | * | 9/2009 | Hank ............................ 210/650 |

FOREIGN PATENT DOCUMENTS

DE   10 2006 012 198   9/2007

OTHER PUBLICATIONS

Data Sheet: Exact-Air Integrity Tester—Millipore—Nov. 1, 1999.
(Continued)

*Primary Examiner* — Eliseo Ramos Feliciano
*Assistant Examiner* — Yoshihisa Ishizuka
(74) *Attorney, Agent, or Firm* — Gerald E. Hespos; Michael J. Porco; Matthew T. Hespos

(57) ABSTRACT

An apparatus automatically carries out an integrity test on a filter device having a fluid inlet, a fluid outlet and a venting port. The apparatus includes a filter integrity testing device having a pressure sensor and/or a flowmeter. An inlet connector is connectable to the fluid inlet, is connected via a wetting liquid supply valve to a wetting liquid supply, and is connected via a drainage valve to a first drain. An outlet connector is connectable to the fluid outlet and via an outlet valve to the first or a second drain. A venting port connector is connectable to the venting port and via a measurement valve to the pressure sensor and/or flowmeter. The venting port connector also is connected via a venting valve to a venting pipe, and via a measurement gas valve to a measurement gas source. The valves are controlled by the filter integrity testing device.

9 Claims, 2 Drawing Sheets

(56) References Cited

OTHER PUBLICATIONS

"Technical Brief: Millipore Steam Sterilization & Integrity Testing Procedures"—May 1, 2003.

"Data Sheet: The HydroCorr Integrity Test"—Millipore Corp.—May 1, 1997.

"Technical Brief: Integrity Testing BioASSURE PDA020 Filters"—CUNO Inc.—Jan. 1, 2006.

* cited by examiner

FILTER DEVICE TEST APPARATUS, FILTER INTEGRITY TESTING METHOD AND COMPUTER PROGRAM PRODUCT

BACKGROUND OF THE INVENTION

1. Field of the Invention

The invention relates to a test apparatus for carrying out an automatic integrity test on a filter device, a valve unit connectable to a filter integrity test device to form a test apparatus, a microprocessor controlled method for carrying out an integrity test on a filter device by means of the test apparatus. The invention likewise relates to a computer program product for carrying out integrity tests on filter devices.

2. Description of the Related Art

A methods for carrying out integrity tests on filter devices is described, for example, in US 2003/0234211 A1. To carry out the integrity test on the filter device various fluid connections has to be manually connected and disconnected in order to fill, pressurise and drain the filter device. In particular in case the filter device has to be tested under sterile conditions, an erroneous handling can contaminate the filter device, which then has to be sterilised or disposed.

One object of the invention is, therefore, to propose a test apparatus and a respective method for automatically carrying out integrity tests on filter elements, which largely precludes manual errors by the operator. The object is achieved by the subject-matter as defined in the independent claims. Preferred embodiments are subject to the dependent claims.

SUMMARY OF THE INVENTION

One aspect of the invention relates to a test apparatus for automatically carrying out an integrity test on a filter device having a fluid inlet, a fluid outlet and a venting port. The test apparatus includes a filter integrity testing device having a pressure sensor and/or a flowmeter. The test apparatus also has an inlet connector, an outlet connector and a venting port connector. The inlet connector is fluidly connectable to the fluid inlet. More particularly, the inlet connector is fluidly connected via a wetting liquid supply valve to a wetting liquid supply, and is fluidly connected via a drainage valve to a first drain. The outlet connector is fluidly connectable to the fluid outlet. More particularly, the outlet connector is fluidly connected via an outlet valve to the first or a second drain. The venting port connector is fluidly connectable to the venting port. More particularly, the venting port connector is fluidly connected via a measurement valve to the pressure sensor and/or the flowmeter of the filter integrity testing device. The venting port connector also is fluidly connected via a venting valve to a venting pipe and is fluidly connected via a measurement gas valve to a measurement gas source. The valves are controlled by means of the filter integrity testing device.

By controlling the valves of the test apparatus by means of the filter integrity testing device a testing method for testing a filter device can be carried out automatically after the filter device is fluidly connected to the test apparatus. A fluid is a gas or a liquid, wherein a fluid connection enables a flow of a fluid through this connection. After establishing the fluid connection between the filter device and the test apparatus no further manual actions of an operator has to take place, which reduces the probability of erroneous operations by the operator. Furthermore, the test apparatus particularly is capable of performing the wetting/filling, testing and draining step (in any order) of the filter integrity test, e.g. filling, testing and draining step for hydrophobic filter(s) and/e.g. wetting, draining and testing for hydrophilic and hydrophobic filter(s), automatically and/or unsupervised (for hydrophobic filters an alcohol solution e.g. a 60 percent solution of isopropanol in water may be used instead of water).

Exemplarily, the test apparatus can be formed or built by connecting or assembling the filter integrity testing device to a valve unit.

The invention also relates to a valve unit fluidly connectable to a filter device having a fluid inlet, a fluid outlet and a venting port and connectable to an external filter integrity testing device having a pressure sensor and/or a flowmeter. The valve unit comprises an inlet connector, an outlet connector and a venting port connector. The inlet connector is fluidly connectable to the fluid inlet. More particularly, the inlet connector is fluidly connected via a wetting liquid supply valve to a wetting liquid supply, and is fluidly connected via a drainage valve to a first drain. The outlet connector is fluidly connectable to the fluid outlet, and preferably is fluidly connected via an outlet valve to the first or a second drain. The venting port connector is fluidly connectable to the venting port. More particularly, the venting port connector is fluidly connected via a measurement gas valve to a complementary measurement gas connector, which is fluidly connectable to the pressure sensor and/or the flowmeter of the filter integrity testing device. The venting port connector also preferably is fluidly connected via a venting valve to a venting pipe, and is fluidly connected or connectable via the measurement gas valve to a measurement gas source. The valves comprise communication means for communicatively connecting the valves with the filter integrity testing device allowing the control of the valves by means of the filter integrity testing device.

The connection of the valve unit to an appropriate filter integrity testing device allows an apparatus for automatically carrying out an integrity test on a filter device. Therefore, the valves of the valve unit are controllable by means of the filter integrity testing device and, thus, an automatic testing method for testing a filter device can be carried out using the valve unit. Furthermore, the advantages and characteristics described with respect to the valve unit apply also to the test apparatus and vice versa.

Exemplarily, the valve unit further comprises a complementary electrical connector connectable to an electrical connector of the filter integrity testing device. Additionally or alternatively the complementary measurement gas connector of the valve unit is connectable to a measurement gas connector of the filter integrity testing device. Exemplarily, the connection between the filter integrity testing device and the valve unit, i.e. the electrical connection of the complementary electrical connector to the electrical connector and/or the fluid connection of the complementary measurement gas connector to the measurement gas connector, is exemplarily established by moving the filter integrity testing device along a direction R relative to the valve unit. As an example, the filter integrity testing device can be set on top of the valve unit thereby establishing the electrical and/or fluid connection. In particular, the communication means for communicatively connecting the valves with the filter integrity testing device can be data lines, such as electrically conducting wires or wireless connections.

The term "fluid" as used in this application comprises a gas and/or a liquid, wherein a fluid connection enables a flow of a fluid through this connection. After establishing the fluid connection between the filter device and the test apparatus or the valve unit no further manual actions of an operator have to take place, which reduces the probability of erroneous operations by the operator. Furthermore, the test apparatus or the valve unit particularly is capable of performing the wetting, testing and draining step (in any order) of the filter integrity test, e.g. wetting/filling, testing and draining step for hydrophobic filter(s) and/e.g. wetting, draining and testing for hydrophilic and hydrophobic filter(s), automatically and/or unsupervised (for hydrophobic filters an alcohol solution e.g. a 60 percent solution of isopropanol in water may be used instead of water). Therefore, the overall operability is improved.

Particularly, during the integrity testing of the filter device, the measurement gas source provides a pressurised measurement gas, wherein the measurement gas source can comprise an internal measurement gas source, such as a compressor located within the test apparatus or within the valve unit, or a measurement gas source connector, which is configured to be fluidly connected to an external measurement gas source, such as an external compressor, a pressure vessel, a compressed air bottle or a compressed air container. In order to allow the integrity testing of sterile filter devices under sterile conditions, the measurement gas source can be configured to provide a sterile measurement gas, e.g. sterile air.

The wetting liquid supply preferably comprises a wetting liquid supply connector, wherein a wetting liquid storage container is fluidly connectable to the wetting liquid supply connector. Furthermore, the test apparatus or the valve unit can comprise wetting liquid pumping means, exemplarily pneumatic pumping means, in order to convey the wetting liquid from the wetting liquid supply connector and/or the wetting liquid storage container to the filter device.

The first and second drain of the valve unit as well as of the test apparatus can comprise a first and a second drainage pipe, wherein the first and second drainage pipes can be fluidly connected to two distinct sewers, e.g. by means of a first and a second drain connector, or they can be fluidly connected to a common sewer, e.g. via a common drain connector.

The test apparatus or the valve unit can comprise a dry gas source fluidly connectable via a dry gas valve to the venting port connector. The dry gas provided can be used to remove remaining liquid from the filter device after the integrity test has been completed. As an exemplarily dry gas compressed air, in particular compressed sterile air, can be used. The dry gas source can comprise an internal dry gas source, such as a compressor located within the test apparatus or within the valve unit, or a dry gas source connector, which is configured to be fluidly connected to an external dry gas source, such as an external compressor, a pressure vessel or a compressed air bottle or container. In order to allow the drying of sterile filter devices under sterile conditions, the dry gas source can be configured to provide a sterile dry gas, e.g. sterile air. Furthermore, the dry gas provided can have a suitable sterilization temperature in order to sterilise the interior of the filter testing device and/or the internal volumes of the test apparatus or the valve unit. In particular, the internal volumes of the test apparatus or the valve unit can be contaminated by fluids and/or micro-organisms originating from the filter device to be tested and coming into contact with the internal volumes during the integrity test. In order to heat the dry gas the dry gas source and/or the test apparatus respectively the valve unit can comprise a heating device.

Additionally, other gases can be used such as hydrogen peroxide ($H_2O_2$) or steam (for example at 121° C.) in order to sterilise the interior of the integrity test unit and/or the filter device. A drying step with sterile air can then be used to eliminate residual vapour.

The invention also relates to a microprocessor controlled method for carrying out an integrity test on a filter device having a fluid inlet, a fluid outlet and a venting port, wherein a hydrophilic or hydrophobic filter material is arranged between the fluid inlet and the fluid outlet. The method comprises fluidly connecting the filter device to the above-described test apparatus so that an inlet connector is connected to the fluid inlet, an outlet connector is connected to the fluid outlet, and a venting port connector is connected to the venting port. The method then includes providing an appropriate wetting liquid or testing liquid, exemplarily an aqueous wetting liquid, such as water or an alcohol solution, by means of a wetting liquid supply that is fluidly connectable to the fluid inlet. The method further includes instructing the filter integrity testing device of the test apparatus to carry out and control an integrity test procedure, and performing the integrity test procedure.

The establishment of a fluid connection between the filter device and the test apparatus can also comprise the initial step of assembling the test apparatus from a valve unit and an external filter integrity testing device. The feature "providing a wetting liquid or testing liquid" can also include a pumping or pneumatic conveying of the wetting fluid or testing liquid into the filter device, when the wetting liquid supply is connected to the fluid inlet, e.g. when a respective wetting liquid supply valve is open. A wetting liquid is appropriate in case the wetting liquid is capable of wetting the hydrophilic or hydrophobic filter material. In case of a hydrophilic filter material the wetting liquid can be an aqueous liquid or aqueous solution. In case of a hydrophobic filter material the wetting liquid can be a non-aqueous liquid, such as an alcohol, a hydrocarbon or the like. In case the liquid is not capable to wet the filter material, the liquid is named "testing liquid".

Instructing the filter integrity testing device can comprise the manual or automatic selection of a predefined integrity test procedure appropriate for the actual filter device. The predefined integrity test procedure can be retrieved from an internal database of the filter integrity testing device or from an external database, a storage medium etc. Furthermore, instructing the filter integrity testing device can comprise the input of free configurable procedure steps by an operator. The input can be performed manually, e.g. by means of a keyboard or a touch screen of the test apparatus or of the filter integrity testing device. Exemplarily, the test procedure is automatically carried out, after the instruction is completed. As an advantage the test procedure can be carried out without supervision by the operator, e.g. over night.

In case the filter material is a hydrophilic or a hydrophobic filter material, the integrity test procedure can comprise wetting the hydrophilic or hydrophobic filter material in the filter device with the appropriate wetting liquid by filling the filter device at least partially with wetting liquid until the filter material is substantially completely saturated with the wetting liquid. This aspect of the method then proceeds by draining wetting liquid from the filter device keeping the filter material substantially completely saturated providing a pressurised measurement gas to the venting port to apply a pneumatic pressure to the saturated filter material, recording the applied pneumatic pressure with a pressure sensor and/or recording the applied measurement gas volume with a flowmeter and determining the integrity status of the filter device based on the recorded pneumatic pressure and/or measurement gas volume.

In case a water based test is to be performed on a hydrophobic filter material, the integrity test procedure can comprise covering the hydrophobic filter material in the filter device with the testing liquid by filling the filter device at least partially with testing liquid until the filter material is substantially completely covered with the testing liquid. This aspect of the method then proceeds by providing a pressurised measurement gas to the venting port in order to apply a hydraulic pressure to the liquid covered filter material, recording the applied pressure of the measurement gas with a pressure sensor and/or recording the applied measurement gas volume with a flowmeter, and determining the integrity status of the filter device based on the recorded applied pressure and/or applied volume of the measurement gas.

Subsequently, the testing liquid may be drained from the filter device having the hydrophobic filter material.

As an advantage the manual wetting or flooding of the filter material by the operator in preparation of the integrity testing can be omitted, since these preparation steps can be performed automatically by means of the test apparatus. Furthermore, these steps can be controlled and automatically recorded in a test report. The test report can be stored to a storage medium and/or to a database and/or printed by a printer.

The recording of the parameters measured by the pressure sensor and/or the flowmeter can comprise the storage of the recorded parameters to a database or a storage medium, the display of the parameters on a display device and/or the printing of the parameters with a printing device. Determining the integrity status can comprise the computation of characteristic values of the filter material such as the liquid permeability, the gas permeability, the wetting capacity and other parameters, which can be determined using the diffusion test, water intrusion test, the bubble point test and other tests. Furthermore, determining the integrity status can comprise a decision, whether the tested filter device is within its specifications and can be further used. The result of the decision can de displayed, stored or printed, as described above.

The integrity test procedure can comprise the step of drying the filter material in the filter device. The drying can be carried out using dry gas draining the remaining wetting and/or testing liquid out of the filter material and/or the interior of the filter device.

The integrity test procedure can comprise the step of sterilising the filter material in the filter device. In particular the sterilisation can be performed using hot steam and/or dry gas having a suitable sterilization temperature (in case of steam of about 121 degrees Celsius or more). In particular, when testing a sterile filter device, the wetting liquid and/or testing liquid, the measurement gas as well as the dry gas can be sterile.

As an advantage the manual drying or sterilisation of the filter material by the operator in finishing the integrity testing can be omitted, since these final steps can be performed automatically by means of the test apparatus. Furthermore, these steps can be controlled and automatically recorded in a test report. The test report can be stored to a storage medium and/or to a database and/or printed by a printer.

However, the steps of wetting/filling and/or drying of the filter material may be excluded from the integrity test procedure by instructing the filter integrity testing device accordingly. By disabling the wetting/filling and the drying step the filter integrity testing device may act via the valve unit as an automatically controlled filter integrity testing device.

The invention also relates to a computer program product for a computer-controlled integrity test on a filter device. The computer program comprises coding segments that when loaded and executed on a suitable system can execute a method for carrying out an integrity test on a filter device in accordance with above-described invention. The computer programs can be loaded individually or commonly, directly or indirectly into the internal memory of a computer and/or the filter integrity testing device.

Additional objects, advantages and features of the present invention will now be described in greater detail, by way of example, with reference to preferred embodiments depicted in the drawing.

DETAILED DESCRIPTION OF THE PREFERRED EMBODIMENTS

Figure 1:
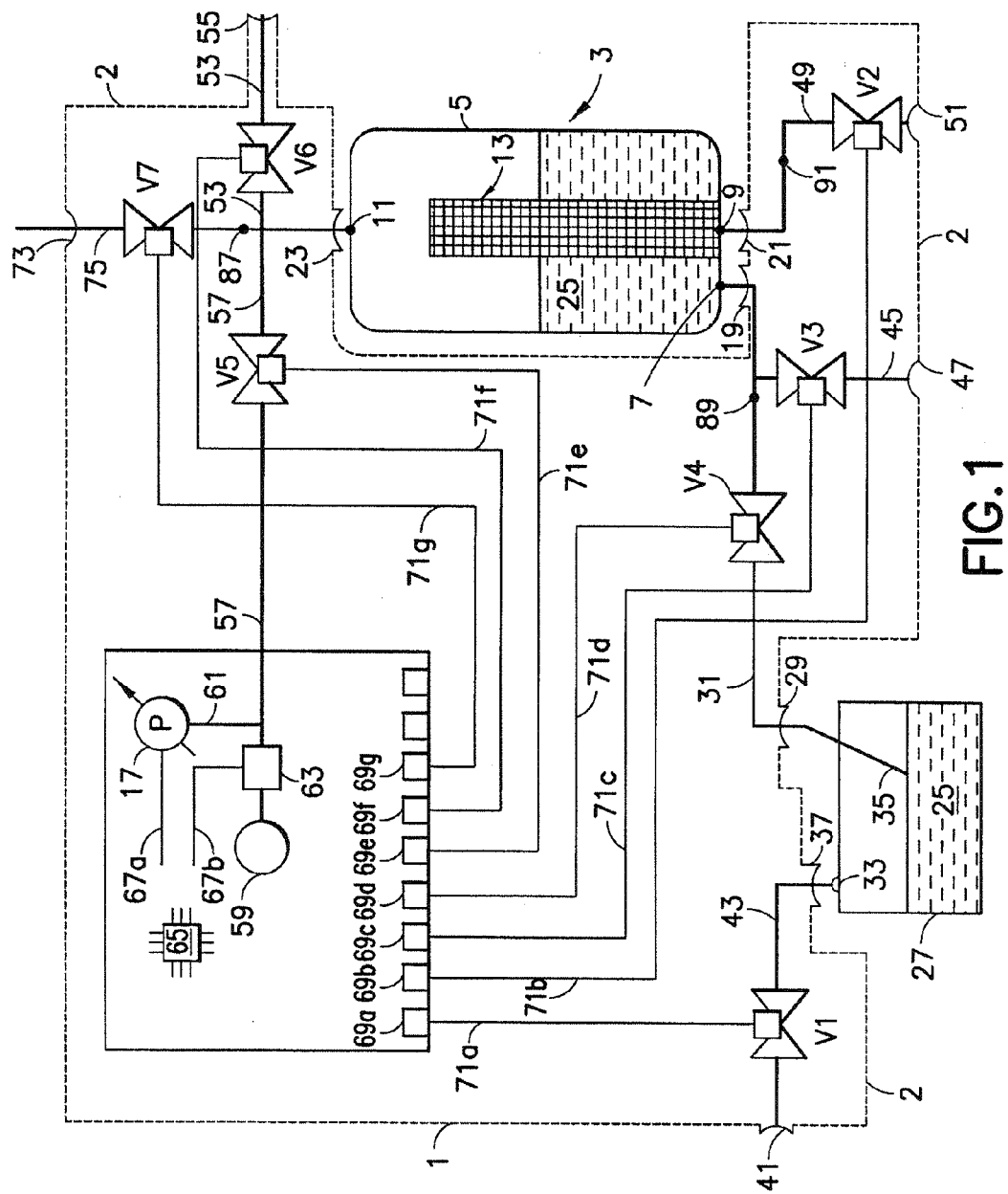
FIG. 1 illustrates an embodiment of an filter device test apparatus.

FIG. 1 shows an apparatus 1 for carrying out an automatic integrity test on a filter device 3. A filter housing 5 of the filter device 3 comprises a fluid inlet 7, a fluid outlet 9, and a venting port 11. A filter material 13 is arranged in the filter housing 5 between the fluid inlet 7 and the fluid outlet 9. Therefore, the fluid inlet 7 is fluidly connected to the fluid outlet 9 via the filter material 13. In other words, a fluid flowing into the filter device 3 through the fluid inlet 7 can be filtered by means of the filter material 13 and leave the filter device 3 through the fluid outlet 9. The venting port 11 is arranged in the filter housing 5 such that a direct fluid connection between the venting port 11 and the fluid inlet 7 exists. In other words the venting port 11 is fluidly connected to the fluid outlet 9 via the filter material 13. Alternatively, the venting port 11 can be arranged in the filter housing 5 such that a direct fluid connection between the venting port 11 and the fluid outlet 9 exist, wherein a fluid connection between the fluid inlet 7 and the venting port 11 via the filter material 13 exists.

The filter material 13 can comprise a membrane filter, in particular a hydrophobic membrane filter or a hydrophilic membrane filter. An exemplarily hydrophobic membrane can consist of polytetrafluorethylene (PTFE), which may have an average pore diameter of about 0.2 micrometers. An exemplarily hydrophilic membrane may be based on polyether sulfone (PESU), also having an average pore diameter of 0.2 micrometer.

The filter material 13 can comprise various shapes, for example flat circular shapes or the shape of a filter candle. The filter material 13 can be a sterile filter material, in particular a filter material, which is adapted to be sterilized by means of pure steam at a temperature of about 121 degrees Celsius or above. Therefore, the sterile filter material 13 can be integrated into sterile systems, in the manner they are used in the pharmaceutical industry.

The filter device test apparatus 1 comprises a filter integrity testing device 15 having at least one pressure sensor 17. In order to allow a fluid connection of the filter device 3 to the filter device test apparatus 1, the apparatus 1 comprises an inlet connector 19, an outlet connector 21, and a venting port connector 23. The inlet connector 19 is configured to establish a fluid connection to the fluid inlet 7 of the filter device 3. In other words, the inlet connector 19 can be fluidly connected to the fluid inlet 7 by a direct or indirect fluid connection, for example by means of a pipe or a hose. In this respect a fluid connection means, that a fluid, i.e. a liquid and/or a gaseous phase, can flow from the fluid inlet 7 to the inlet connector 19 or vice versa. Respectively, the outlet connector 21 is fluidly connectable to the fluid outlet 9 of the filter device 3 and the venting port connector 23 is fluidly connectable to the venting port 11 of the filter device 3.

To prevent a mismatch of the fluid connections between the inlet connector 19, the outlet connector 21, and the venting port connector 23 with the respective fluid inlet 7, fluid outlet 9, and venting port 11 of the filter device 3 the inlet connector 19, the outlet connector 21 and the venting port connector 23 can comprise respective connectors of different shape and/or size, wherein the respective connectors can only be connected to a belonging fluid inlet, fluid outlet or venting port of the filter device or to a belonging connection hose of connection pipe for connecting the connector of the apparatus 1 with the respective port or the filter device 3.

To perform the integrity tests of the filter device 3 a wetting liquid 25 is needed. The wetting liquid 25 can be provided in a wetting liquid storage container 27, which can be connected to a wetting liquid supply connector 29 of the filter device test apparatus 1. From the wetting liquid supply connector 29 the wetting liquid 25 can flow through the wetting liquid supply pipe 31 via a wetting liquid supply valve V4 to the inlet connector 19. The wetting liquid supply valve V4 can be an on off valve, a proportional valve, or a proportional control valve. In order to transport the wetting liquid 25 from the wetting liquid storage container 27 to the inlet connector 19 and, finally, into the filter device 3 the filter device test apparatus 1 can comprise a wetting liquid pumping means, for example a pump, which can be arranged between the wetting liquid supply connector 29 and the wetting liquid supply valve V4. In particular, the peristaltic pump can be used as wetting liquid pumping means.

In an embodiment the wetting liquid 25 is transported by means of a gas pressure from the wetting liquid storage container 27 via the wetting liquid supply valve V4 into the filter device 3. In this case, the wetting liquid supply container 27 is a pressure vessel 27 having a pressurised gas inlet 33 and a rising pipe 35, which is connectable to the wetting liquid supply connector 29 of the filter device test apparatus 1. By providing pressurised gas, such as compressed air, at the pressurised gas inlet 33 of the wetting liquid storage container 27 the inner space of the wetting liquid storage container 27 is set under pressure, so that the wetting liquid 25 is conveyed via the rising pipe 35 out of the wetting liquid storage container 27 to the wetting liquid supply connector 29.

In an exemplarily embodiment of the filter device test apparatus 1 a pressurised gas supply connector 37 is provided, which is configured to be connected to the pressurised gas inlet 33 of the wetting liquid storage container 27. In order to provide pressurised gas at the pressurised gas supply connector 37 the filter device test apparatus 1 can comprise a pressurised gas source 39, wherein the pressurised gas source 39 can comprise an internal pressurised gas source, such as a compressor, or a pressurised gas source connector 41, which is configured to establish a fluid connection to an external pressurised gas source (not shown). A pressurised gas pipe 43 fluidly connecting the pressurised gas source connector 41 and the pressurised gas supply connector 37 comprises a pressurised gas control valve V1 in order to control the pressure of the pressurised gas provided at the pressurised gas supply connector 37. The pressurised gas control valve V1 can be a proportional valve, a proportional control valve or an on/off valve. Exemplarily the pressurised gas control valve V1 is an on/off valve in case the wetting liquid supply valve V4 is a proportional valve. Vice versa the pressurised gas control valve V1 is preferably a proportional valve in case the wetting liquid supply valve V4 is an on/off valve.

The inlet connector 19 is additionally connected via a drainage valve V3 to a first drainage pipe 45. In general it is sufficient, that the drainage valve V3 comprises of an on/off valve. In case the drainage valve V3 is open, a fluid can flow from the fluid inlet 7 of the filter device 3 through the inlet connector 19, the drainage valve V3, and the first drainage pipe 45 to a first drain connector 47. From the first drain connector 47 the liquid can flow to a sewer.

The outlet connector 21, which is configured to be fluidly connected to the fluid outlet 9 of the filter device 3, is fluidly connected via a second drainage pipe 49 and a outlet valve V2 to a second drain connector 51. From the second drain connector 51 the fluid can be dumped into a sewer. Instead of providing a first drain connector 47 and a second drain connector 51 the first drainage pipe 45 and the second drainage pipe 49 can be fluidly connected to a common drain connector (not shown). Advantageously, in this case only one connector and one drainage hose to a sewer is necessary in order to dump the fluid drained from the filter device 3.

The venting port connector 23 is fluidly connected through a venting pipe 53 and a venting valve V6 to a venting connector 55 of the filter device test apparatus 1. In general it is sufficient, that the venting valve V6 comprises of an on/off valve. In case the venting valve V6 is open, air can flow from and to the filter device 3 through the venting connector 55 respectively to an from the outside. Exemplarily, the venting connector 55 is connected to a bacteria and/or virus filtering device (not shown), which is capable to filter bacteria and/or viruses out of the air flowing from the filter device 3 into the outside or from outside into the filter device 3. In case the filter device 3 is of a sterile type the filter device 3 is advantageously not contaminated by bacteria and/or viruses from the outside, which may be conveyed from the outside to the inside of filter device 3 by the air flowing into the filter device 3. On the other hand the outside environment would not be contaminated by microorganisms conveyed by airflow from the inside of filter device 3 to the outside in case filter device 3 is contaminated.

The venting port connector 23 is fluidly connected through a measurement gas supply pipe 57 and a measurement gas valve V5 to a measurement gas source 59. The measurement gas source 59 can comprise an internal measurement gas source, such as a compressor, or a measurement gas source connector of the filter integrity testing device 15 or the apparatus 1, which is configured to be fluidly connected to an external measurement gas source (not shown), such as an external compressor, a pressure vessel, a compressed air bottle or a pressurised gas container. Exemplarily, the measurement gas source 59 is fluidly connected with the pressurised gas source connector 41. This fluid connection between these two connectors can be internally or externally. In case, a higher pressure is provided from the measurement gas source 59 in relation to the pressure needed at the pressurised gas control valve V1 or vice versa the fluid connection between can comprise a pressure reducing valve. For example, compressed air is used as a measurement gas, wherein a pressure of about 6 bars is necessary in order to perform the filter integrity test of the filter device 3 connected to the filter device test apparatus 1. On the other hand, an air pressure of about 1 bar might be sufficient in order to transport the wetting liquid 25 from the wetting liquid storage container 27 into the filter device 3. Therefore, an internal or external fluid connection from the internal or external measurement gas source 59 through a pressure reducing valve to the pressurised gas source connector 41 or to the pressurised gas control valve V1 may be provided, wherein the pressure reducing valve (not shown) reduces the pressure of six bars down to about 1 bar. Exemplarily, the measurement gas source 59 is capable to provide sterile measurement gas, such as sterile air.

Further, the measurement gas supply pipe 57 providing measurement gas to the venting port connector 23 is fluidly connected through a measurement pipe 61 to the pressure sensor 17 of the filter integrity testing device 15. By means of the pressure sensor 17 the filter integrity testing device 15 can determine the pressure, which is present within the filter housing 5. Furthermore, a flowmeter 63 can be located along the measurement gas supply pipe 57 in order to determine the mass or volume of the measurement gas, which flows inside or outside the interior of the filter housing 5 through the flowmeter 63.

The filter integrity testing device 15 can comprise a microprocessor 65, which can receive the measurement data generated by the pressure sensor 17 via a pressure data line 67a as well as the measurement data generated by the flowmeter 63 via a flow data line 67b. The measurement data can be stored to a storage medium and/or transmitted to an external data processing device (not shown).

It is further preferred, that the filter device test apparatus comprises an internal dry gas source or a dry gas source connector 73 connectable to an external dry gas source. The dry gas source or the dry gas source connector 73 is fluidly connected to the venting port connector 23 via a dry gas pipe 75 and a dry gas valve V7 in order to provide a dry gas to the venting port 11 of the filter device 3. Exemplarily the dry gas is compressed air. The dry gas may also be provided by the measurement gas source 59, i.e. measurement gas source 59 and dry gas source may be identical. When dry gas is provided to the venting port 11 of the filter device 3, a fluid remaining within the filter housing 5 can be pressed outside via the fluid inlet 7 and/or the fluid outlet 9.

Exemplarily, the dry gas source is capable to provide a dry gas having a suitable sterilisation temperature and about 2 bars pressure. By providing the filter device 3 with such a heated dry gas it is possible to sterilise the interior of the filter housing 5 in particular to sterilise the filter material 13. As an alternative, a heating device (not shown) may be provided, which is capable to heat the dry gas flowing through the dry gas supply pipe 75 to a suitable sterilisation temperature (e.g. of about 180° C. or more). For example, the heating device can comprise the heat exchanger and/or a heating element directly or indirectly contacting the dry gas flowing through the gas supply pipe 75. Additionally, other gases can be used such as hydrogen peroxide ($H_2O_2$) or steam (for example at 121° C.) in order to sterilise the interior of the integrity test unit and/or the filter device. A drying step with sterile air can then be used to eliminate residual vapour.

The microprocessor 65 of the filter integrity testing device 15 can provide controlling signals to valve controllers 69a to 69g, wherein each of the valve controllers 69a to 69g is assigned to one of the valves V1 to V7 of the filter device test apparatus 1. Each of the valve controllers 69a to 69g is linked by a respective valve controlling line 71a to 71g to the respective valve V1 to V7, which is assigned to the respective valve controller 69a to 69g. Consequently, the microprocessor 65 is enabled to control all valves, which are necessary to prepare a filter device 3 for a filter integrity measurement, to perform the actual filter integrity measurement and to finish the filter device 3 after performing the filter integrity testing for further use in production. By the software running on the microprocessor 65 a method for testing the integrity of a filter device is provided, wherein the filter integrity testing can be performed automatically without further user interaction and, thus, reducing the probability of handling errors during the filter integrity testing.

Exemplarily, the filter device test apparatus 1 has an apparatus housing 2, which enclosed the above described elements of the test apparatus 1. In particular the apparatus housing 2 can enclose the filter integrity testing device 15 and all valves V1-V7. At least two of the valves V1-V7, in particular all valves V1-V7, can be part of a valve unit leading to a compact construction of the apparatus 1.

Optionally, two, three, or more temperature sensors 87, 89, 91 (such as a resistance thermometer or resistive thermal device, e.g. a PT100 sensor, or, alternatively, a thermocouple) may be provided. Exemplarily, two temperature sensors 87, 89 may be provided on an upstream side of the filter device 3 (e.g. a first temperature sensor 87 in the section between valves V5, V6 and V7 and a second temperature sensor 89 in the section between valves V3 and V4) and at least one temperature sensor 91 may be provided on the downstream side of the filter device 3 (e.g. in proximity of the valve V2). Based on the signals provided by the temperature sensors to the microprocessor 65, a control or supervision of the drying process of the filter device 3 may be performed particularly based on the inlet temperature and the outlet temperature of the drying gas. Moreover, the signal of the temperature sensor on the downstream side of the filter device 3 may be (also) used for validating an eventual steaming cycle of the filter device 3. Respective set points (temperature start end temperature end and/or temperature difference between start and end) for the steaming cycle and/or for the validation process may be determined by respective steaming and/or drying validation studies.

Example 1

According to a first example, a diffusion test (or any other suitable test e.g. bubble point test or multipoint diffusion test) of a hydrophilic filter material 13 is performed with the filter device test apparatus 1, as shown in FIG. 1, wherein the valves V1 to V7 are switched into states according to Table 1. In a first step a filter device 3 is provided, wherein the fluid inlet 7 is fluidly connected to the inlet connector 19, the fluid outlet 9 is fluidly connected to the outlet connector 21, and the venting port 11 is fluidly connected to the venting port connector 23, respectively.

In order to perform the diffusion test of the hydrophilic filter candle made of filter material 13, the filter housing 5 is flooded with water, as an exemplarily wetting liquid 25, via the wetting liquid supply pipe 31 and the inlet connector 19. To perform this first wetting step the pressurised gas control valve V1, the wetting liquid supply valve V4, and the venting valve V6 are opened, whereas the outlet valve V2, the drainage valve V3, the measurement gas valve V5 as well as the dry gas valve V7 will remain closed. During this valve configuration compressed air, as an exemplarily pressurised gas, is enabled to flow through the pressurised gas source connector 41 through the pressurised gas control valve V1, the pressurised gas supply connector 37 and the pressurised gas inlet port 33 into the interior of the wetting liquid storage container 27. Since the wetting liquid supply valve V4 is open, the water 25 contained in the wetting liquid storage container 27 is forced by the pressure inside the wetting liquid storage container 27 to flow through the rising pipe 35 and the wetting liquid supply pipe 31 to the inlet connector 19 into the interior of the filter housing 5. The air filling the interior of the filter housing 5 is displaced through the venting pipe 53, the venting valve V6 and the venting connector 55 to the environment.

In a second wetting step the venting valve V6 is closed and the outlet valve V2 is opened, wherein further water 25 is admitted until the filter material 13 has been completely permeated by water 25 for a specific time. The water 25, which has permeated the filter material 13 flows through the fluid outlet 9 outside of the filter device 3 and is received by the outlet connector 21, from which the water 25 flows through the second drainage pipe 49 and the outlet valve V2 to a sewer connected to the second drain connector 51.

In order to remove air and trapped in the filter material 13 or the interior or the filter housing 5 the venting valve V6 is pulsating during a filtered wetting step. For example, the venting valve V6 can open and close within a period of about 10 seconds, preferably within a period of 5 seconds and in particular within a period of about 1 second.

After the filter material 13 is completely permeated by water 25 by a specific time, the water 25 is removed from the interior of the filter housing 5 through the fluid inlet 7, the inlet connector 19, the first drainage pipe 45 and the drainage valve V3 by closing the pressurised gas control valve V1, the wetting liquid supply valve V4 and by opening the drainage valve V3, the outlet valve V2 and the venting valve V6.

Thereafter, the filter housing 5 is pressurised in a testing step by compressed air by means of the filter integrity testing device 15 via the measurement gas supply pipe 57, the opened measurement gas valve V5, and the venting port connector 23. All other valves except the outlet valve V2 are closed during the testing step. The applied pressure is measured by the pressure sensor 17 and the quantity of measurement gas passing the filter material 13 during the testing step is measured by the flowmeter 63 and/or by using an algorithm integrating the detected pressure drop.

After the testing step has been finished the interior of the filter housing 5 can be dried and/or sterilised by providing dry gas to the venting port 11 of the filter device. To perform the drying the measurement gas valve V5 is closed and drainage valve V3 as well as the dry gas valve V7 are opened. During a first drying step liquid remaining in the interior of the filter housing 5 is pressed outside through the fluid inlet 7 and the fluid outlet 9. The removed liquid can flow to a sewer via the first and second drainage connectors 47, 51. The drainage valve is closed and the drying is completed during a second drying step with only the outlet valve V2 open.

TABLE 1

Valve states during a diffusion test of a hydrophilic filter material

| Valve | V1 | V2 | V3 | V4 | V5 | V6 | V7 |
|---|---|---|---|---|---|---|---|
| Wetting 1 | open | closed | closed | open | closed | open | closed |
| Wetting 2 | open | open | closed | open | closed | closed | closed |
| Wetting 3 | open | open | closed | open | closed | pulsating | closed |
| Draining | closed | open | open | closed | closed | open | closed |
| Testing | closed | open | closed | closed | open | closed | closed |
| Drying 1 | closed | open | open | closed | closed | closed | open |
| Drying 2 | closed | open | closed | closed | closed | closed | open |
| End | closed | open | open | closed | closed | open | closed |

As an example the duration of the single steps compiled in table 1 can be as follows: wetting step 1 about 1 minute, wetting step 2 about 1 minute, wetting step 3 about 3 minutes, draining step about 2 minutes, drying step 1 about 5 minutes, and drying step 2 about 10 minutes. The duration of the integrity testing step of 5 minutes is depended on the required test parameters, as for example diffusion test pressure of about 2500 mbar, the maximum diffusion of about 15 ml/min, the minimum bubble point of about 3200 mbar and the maximum bubble point of about 5000 mbar.

Figure 2:
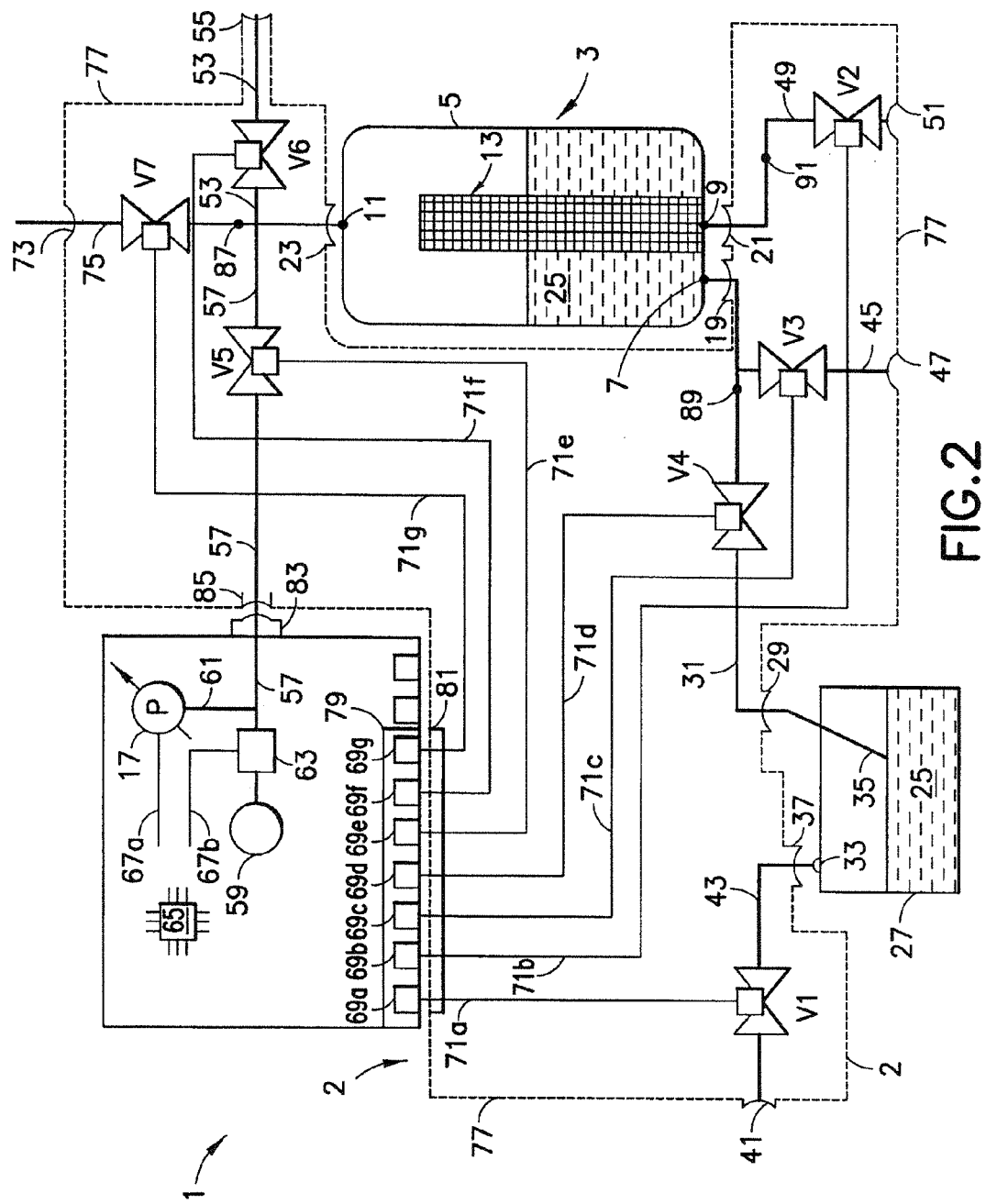
FIG. 2 illustrates a further embodiment of the filter device test apparatus.

FIG. 2 shows another embodiment of a filter device test apparatus 1 for carrying out an automatic integrity test on a filter device 3. The configuration and function of the single elements of the apparatus 1 is similar to the embodiment shown in FIG. 1 and, therefore, equivalent elements are labelled with the same reference signs.

The filter device test apparatus 1 is configured to be fluidly connected to a filter device 3, as shown in FIG. 1. Therefore, the inlet connector 19, the outlet connector 21 and the venting port connector 23 can be identical to the respective connectors shown in FIG. 1. In order to provide a wetting liquid 25 to the filter device 3, the apparatus 1 comprises an analogous configuration connectable to a wetting liquid storage container 27 and capable to convey the wetting liquid 25 by means of pressurised gas. The wetting and drainage of the filter device 3 is controlled by the valves V1 to V4, as described with respect to FIG. 1. The venting and drying of the filter device 3 can be carried out as described with respect to FIG. 1. In particular the configuration and operation of the venting valve V6 and the drying gas valve V7 can be identical to the above described valves.

In contrast to the embodiment shown in FIG. 1 the filter device test apparatus 1 shown in FIG. 2 comprises a filter integrity testing device 15, which is external from a valve unit 77 having a valve unit housing, enclosing the valves V1-V7 and other elements for connecting the filter device 3. The valve unit can comprise at least two of the valves V1-V7 and in particular all valves V1-V7, as shown in FIG. 2. However, particularly the measurement valve V5 can be also located within the filter integrity testing device 15. The measurement valve V5 controls the flow of measurement gas through the measurement gas supply pipe 57, which is disconnectable and connectable via a measurement gas connector 83 of the filter integrity testing device 15 an a complementary measurement gas connector 85 of the valve unit 77. Exemplarily, the measurement gas connector 83 and/or the complementary measurement gas connector 85 comprise a valve (not shown) sealing the part of the measurement gas supply pipe 57 belonging to the filter integrity testing device 15 and/or the part of the measurement gas supply pipe 57 belonging to the valve unit 77 towards the environment outside.

The microprocessor 65 of the filter integrity testing device 15 can also control the valves V1-V7, which are part of the valve unit 77. Therefore, the valve controllers 69a to 69g of the filter integrity testing device 15 are connected to the respective valves V1 to V7 of the valve unit 77, for example, by means of a respective valve controlling line 71a to 71g or by means of a wireless connection. In order to allow a fast and reliable connection the filter integrity testing device 15 can comprise an electrical connector 79, which can be connected to a complementary connector 81 of the valve unit 77. For example, the electrical connector 79 can be connected with the complementary electrical connector 81 by arranging the filter integrity testing device 15 besides, on top or below the valve unit 77 and, thereby, moving the filter integrity testing device along a direction R. The connector 79 and the complementary connector can be locked when connected, exemplarily by locking means.

After the filter integrity testing device 15 is connected to the valve unit 77, the microprocessor 65 is enabled to control all valves V1-V7, which are necessary to prepare a filter device 3 for a filter integrity measurement, to perform the actual filter integrity measurement and to finish the filter device 3 after performing the filter integrity testing for further use in production. By the software running on the microprocessor 65 a method for testing the integrity of a filter device is provided, wherein the filter integrity testing can be performed automatically without further user interaction and, thus, reducing the probability of handling errors during the filter integrity testing.

The filter integrity testing device 15 is configured and operated as described with respect to FIG. 1. Therefore, the operational steps given in Example 1 can also carried out by the apparatus as shown in FIG. 2, wherein the operational step can be completed by an initial step of connecting the filter integrity testing device 15 with the valve unit 77, in particular by connecting the electrical connector 79 with the complementary electrical connector 81 and by connecting the measurement gas connector 83 with the complementary measurement gas connector 85.

Similar to the embodiment described with reference to FIG. 1, in the further embodiment of FIG. 2 two, three or more temperature sensors 87, 89, 91 (such as a resistance thermometer or resistive thermal device, e.g. a PT100 sensor, or, alternatively, a thermocouple) may be optionally provided. As an example two temperature sensors 87, 89 may be provided on an upstream side of the filter device 3 (e.g. a first temperature sensor 87 in the section between valves V5, V6 and V7 and a second temperature sensor 89 in the sections between valves V3 and V4). At least one temperature sensor 91 may be provided on the downstream side of the filter device 3 (e.g. in proximity of the valve V2). Based on the signals provided by the temperature sensors to the microprocessor 65, a control or supervision of the drying process of the filter device 3 may be performed particularly based on the inlet temperature and the outlet temperature of the drying gas. Moreover, the signal of the temperature sensor on the downstream side of the filter device 3 may be (also) used for validating an eventual steaming cycle of the filter device 3. Respective set points (temperature start end temperature end and/or temperature difference between start and end) for the steaming cycle and/or for the validation process may be determined by respective steaming and/or drying validation studies.

Example 2

According to a second example, which can be carried out by means of a filter device test apparatus 1 as shown in FIGS. 1 and 2, a water intrusion test (or any other suitable test e.g. water flow test or water penetration test) of a hydrophobic filter material 13 is performed, wherein the valves V1 to V7 are switched into states according to Table 2.

TABLE 2

Valve states during a water intrusion test of a hydrophobic filter material

| Valve | V1 | V2 | V3 | V4 | V5 | V6 | V7 |
|---|---|---|---|---|---|---|---|
| Filling | open | closed | closed | open | closed | open | closed |
| Testing | closed | open | closed | closed | open | closed | closed |
| Drying 1 | closed | open | open | closed | closed | closed | open |
| Drying 2 | closed | open | closed | closed | closed | closed | open |
| End | closed | open | open | closed | closed | open | closed |

During the water intrusion test it is determined how many liquid, in most cases pure water, can be pressed into the hydrophobic filter material, which should be completely unwettable. Therefore, in a first step the filter device 3 containing the hydrophobic filter material 13 is provided, wherein the fluid inlet 7 is fluidly connected to the inlet connector 19, the fluid outlet 9 is fluidly connected to the outlet connector 21, and the venting port 11 is fluidly connected to the venting port connector 23, respectively.

To perform the water intrusion test the filter housing 5 is flooded with water, as a possible testing liquid 25, via the wetting liquid supply pipe 31 and the inlet connector 19. To perform the wetting step the pressurised gas control valve V1, the wetting liquid supply valve V4, and the venting valve V6 are opened, whereas the outlet valve V2, the drainage valve V3, the measurement gas valve V5 as well as the dry gas valve V7 will remain closed. Thus, pressurised gas can flow through the pressurised gas source connector 41 through the pressurised gas control valve V1, the pressurised gas supply connector 37 and the pressurised gas inlet port 33 into the interior of the wetting liquid storage container 27, which in this case contains the testing liquid 25. Since the wetting liquid supply valve V4 is open, the water 25 contained in the wetting liquid storage container 27 is forced by the pressure inside the wetting liquid storage container 27 to flow through the rising pipe 35 and the wetting liquid supply pipe 31 to the inlet connector 19 into the interior of the filter housing 5. The air filling the interior of the filter housing 5 is displaced through the venting pipe 53, the venting valve V6 and the venting connector 55 to the environment. The filter housing 5 is filed with water until the filter material 13 is completely covered by water.

Thereafter, the filter housing 5 is pressurised in a testing step by compressed air delivered by the filter integrity testing device 15 via the measurement gas supply pipe 57, the opened measurement gas valve V5, and the venting port connector 23. All other valves except the outlet valve V2 are closed during the testing step. The pressure sensor 17 determines the pressure applied to the interior of the filter housing 5, while the quantity of measurement gas passing the filter material 13 during the testing step can be measured by the flowmeter 63. In case the filter material 13 is completely hydrophobic the flow of measurement gas will stop, when the pressure reaches a constant level.

After the testing step has been finished the interior of the filter housing 5 can be dried and/or sterilized by providing dry gas to the venting port 11 of the filter device, wherein the first and second drying steps can be carried out, as described in example 1.

What is claimed is:

1. A test apparatus (1) for automatically carrying out an integrity test on a filter device (3) having a filter housing (5) with a filter material (13) in an interior of the filter housing (5), a fluid inlet (7), a fluid outlet (9) and a venting port (11) at a location on the filter housing (5) spaced from the fluid inlet (7) and the fluid outlet (9), the venting port (11) being at a location on the filter housing (5) to prevent fluid in the filter housing from flowing through the venting port (11) while providing gas flow into or out of the filter device (3), the test apparatus (1) comprising:

an external filter integrity testing device (15) having a measurement gas supply pipe (57) communicating with a pressure sensor (17) and/or a flowmeter (63), a measurement gas connector (83) at an externally accessible position on the external filter integrity testing device (15) and communicating with the measurement gas supply pipe (57), the external filter integrity testing device (15) further having an electrical connector (79) at an externally accessible position on the external filter integrity testing device (15); and a valve unit (77) provided separately from the external filter integrity testing device (15) and being configured to be fluidly connected to the filter device (3), the valve unit (77) further having a complementary measurement gas connector (85) at an externally accessible position thereon and configured to be connected to the measurement gas connector (83), and a complementary electrical connector (81) at an externally accessible position thereon and configured to be connected to the electrical connector (79) of the external filter integrity testing device (15), wherein the valve unit (77) comprises:
- an inlet connector (19) fluidly connectable to the fluid inlet (7),
- a wetting liquid supply valve (V4) fluidly connecting the inlet connector (19) to a wetting liquid supply;
- a drainage valve (V3) fluidly connecting the inlet connector (19) to a first drain (45);
- an outlet connector (21) fluidly connectable to the fluid outlet (9)
- an outlet valve (V2) fluidly connecting the outlet connector (21) to a second drain (49);
- a venting port connector (23) fluidly connectable to the venting port (11);
- a measurement gas valve (V5) fluidly connecting the venting port connector (23) to the complementary measurement gas connector (85) that is connected fluidly to the pressure sensor (17) and/or the flowmeter (63) of the filter integrity testing device (15) and a measurement gas source (59);
- a venting valve (V6) fluidly connecting the venting port connector (23) to a venting pipe (53) for providing gas flow into or out of the filter device (3) at a location spaced from the fluid inlet (7) and the fluid outlet (9);
- a dry gas valve (V7) connected to the venting port connector (23) and connectable to a dry gas source; and
- communication means (71b-71f) for communicatively connecting the valves (V2, V3, V4, V5, V6) with the filter integrity testing device (15) and controlling the valves (V2, V3, V4, V5, V6) by means of the filter integrity testing device (15).

2. The test apparatus (1) of claim 1, wherein the wetting liquid supply comprises a wetting liquid supply connector (29) and wherein a wetting liquid storage container (27) is fluidly connectable to the wetting liquid supply connector (29).

3. The test apparatus (1) of claim 2, further comprising wetting liquid pumping means.

4. The test apparatus (1) of claim 3, wherein the wetting liquid pumping means are pneumatic pumping means.

5. The test apparatus (1) of claim 1,
wherein the connection between the filter integrity testing device (15) and the valve unit (77) is established by moving the filter integrity testing device (15) along a direction (R) relative to the valve unit (77).

6. A microprocessor controlled method for carrying out an integrity test by the test apparatus (1) of claim 1 on the filter device (3) having the fluid inlet (7), the fluid outlet (9) and the venting port (11), wherein a hydrophilic or hydrophobic filter material (13) is arranged between the fluid inlet (7) and the fluid outlet (9), the inlet connector (19) of the test apparatus (1) being connected to the fluid inlet (7), the outlet connector (21) of the test apparatus (1) being connected to the fluid outlet (9), and the venting port (23) of the test apparatus (1) being connected to the venting port (11), the method comprising the steps:
- providing a wetting liquid (25) from said wetting liquid supply that is fluidly connectable to the fluid inlet (7);
- connecting the electrical connector (79) of the filter integrity testing device (15) to the complementary electrical connector of the valve unit (77);
- instructing the filter integrity testing device (15) of the test apparatus (1) to carry out and control an integrity test procedure that comprises the steps:
  - opening the venting valve (V6) and closing the measurement gas valve (V5) and the dry gas valve (V7)
  - wetting the hydrophilic or hydrophobic filter material (13) in the filter device (3) with the wetting liquid (25) by filling the filter device (3) at least partially with wetting liquid (25) until the filter material is substantially saturated with the wetting liquid (25) while permitting gas in the filter housing to vent through the venting valve (V6);
  - draining wetting liquid from the filter device (3) keeping the filter material (13) substantially saturated;
  - closing the venting valve (V6) and opening the measurement gas valve (V5) to dry the filter material (13);
  - providing a pressurised measurement gas to the venting port (11) in order to apply a pneumatic pressure to the saturated filter material (13);
  - recording the applied pneumatic pressure with a pressure sensor (17) and/or recording the applied measurement gas volume with a flowmeter (63);
  - determining the integrity status of the filter device (3) based on the recorded pneumatic pressure and/or measurement gas volume; and
  - closing the measurement gas valve (V5) and opening the dry gas valve (V7) for drying the filter material (13); and
- performing the integrity test procedure.

7. A microprocessor controlled method for carrying out an integrity test by the test apparatus (1) of claim 1 on a filter device (3) having the fluid inlet (7), the fluid outlet (9) and the venting port (11), wherein a hydrophobic filter material (13) is arranged between the fluid inlet (7) and the fluid outlet (9), the inlet connector (19) of the test apparatus (1) being connected to the fluid inlet (7), the outlet connector (21) of the test apparatus (1) being connected to the fluid outlet (9), and the venting port connector (23) of the test apparatus (1) being connected to the venting port (11), the method comprising the steps:
- providing a testing liquid (25) from said wetting liquid supply that is fluidly connectable to the fluid inlet (7);
- connecting the measurement gas connector (83) of the complementary gas connector (85) and connecting the electrical connector (79) of the filter integrity testing device (15) to the complementary electrical connector of the valve unit (77);
- instructing the filter integrity testing device (15) of the test apparatus (1) to carry out and control an integrity test procedure, wherein the integrity test procedure comprises the steps:
  - opening the venting valve (V6) and closing the measurement gas valve (V5) and the dry gas valve (V7);
  - covering the hydrophobic filter material (13) in the filter device (3) with the testing liquid (25) by filling the filter device (3) at least partially with testing liquid (25) until the filter material is substantially completely covered with the testing liquid (25) while permitting gas in the filter housing to vent through the venting valve (V6);
  - closing the venting valve (V6) and opening the measurement gas valve (V5) to dry the filter material (13);
  - providing a pressurised measurement gas to the venting port (11) in order to apply a hydraulic pressure to the liquid covered filter material (13);
  - recording the applied pressure of the measurement gas with a pressure sensor (17) and/or recording the applied measurement gas volume with a flowmeter (63);
  - determining the integrity status of the filter device (3) based on the recorded applied pressure and/or applied volume of the measurement gas; and closing the measurement gas valve (V5) and opening the dry gas valve (V7) for drying the filter material (13); and performing the integrity test procedure.

8. The method of claim 7, wherein the integrity test procedure comprises the step:

sterilizing the filter material (13) in the filter device (3).

9. A non-transitory computer readable medium containing computer executable instructions to perform a method, the method comprising:

executing the method of claim 7 for carrying out the integrity test on the filter device.

\* \* \* \* \*